(12) United States Patent
Osaka et al.

(10) Patent No.: US 7,339,799 B2
(45) Date of Patent: Mar. 4, 2008

(54) SWITCHING POWER SUPPLY

(75) Inventors: Shohei Osaka, Niiza (JP); Yoichi Terasawa, Niiza (JP); Yoichi Kyono, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 166 days.

(21) Appl. No.: 11/255,007

(22) Filed: Oct. 21, 2005

(65) Prior Publication Data

US 2006/0098464 A1 May 11, 2006

(30) Foreign Application Priority Data

Nov. 11, 2004 (JP) ............................. 2004-328117

(51) Int. Cl.
*H02M 3/335* (2006.01)
(52) U.S. Cl. .............................. 363/17; 363/16; 363/98
(58) Field of Classification Search ............. 363/21.15, 363/16, 21.16, 131, 21.02, 98, 15, 17–20, 363/97, 86
See application file for complete search history.

(56) References Cited

U.S. PATENT DOCUMENTS

| | | | |
|---|---|---|---|
| 5,430,633 A * | 7/1995 | Smith | 363/20 |
| 5,808,879 A | 9/1998 | Liu et al. | |
| 6,788,556 B2 * | 9/2004 | Hosotani et al. | 363/21.15 |

2006/0098464 A1   5/2006   Osaka et al.

FOREIGN PATENT DOCUMENTS

JP           2003-9525           1/2003

OTHER PUBLICATIONS

U.S. Appl. No. 11/610,626, filed Dec. 14, 2006, Kyono.
U.S. Appl. No. 11/621,284, filed Jan. 9, 2007, Kyono.
U.S. Appl. No. 11/417,153, filed May 4, 2006, Kyono.

* cited by examiner

*Primary Examiner*—Rajnikant B. Patel
(74) *Attorney, Agent, or Firm*—Oblon, Spivak, McClelland, Maier & Neustadt, P.C.

(57) ABSTRACT

A switching power supply includes a first series circuit formed by connecting first and second switching elements in series at both ends of a direct-current power source, a second series circuit formed by connecting a resonant capacitor, a resonant reactor, and a primary winding of a transformer in series at both ends of the switching element, a rectifying-smoothing circuit configured to rectify and smooth a voltage generated on a secondary winding of the transformer, and a control circuit configured to turn the first and second switching elements and on and off alternately based on an output voltage from the rectifying-smoothing circuit. Here, the control circuit sets an on-period of the second switching element to a predetermined time period longer than a half value of a cycle of a resonant current attributable to the resonant reactor and the resonant capacitor, and controls an on-period of the first switching element based on the output voltage from the rectifying-smoothing circuit.

13 Claims, 11 Drawing Sheets

SWITCHING POWER SUPPLY

BACKGROUND OF THE INVENTION

1. Field of the Invention

The present invention relates to a high-efficiency current-resonant type switching power supply.

2. Description of the Related Art

FIG. 1 is a circuit block diagram of a conventional current-resonant type switching power supply. In FIG. 1, a series circuit including switching elements $Q_H$ and $Q_L$ typically implemented by MOSFETs is connected to both ends of a direct-current power source 1. One end of the switching element $Q_H$ is connected to a positive electrode of the direct-current power source 1. One end of the switching element $Q_L$ is connected to a negative electrode of the direct-current power source 1.

A diode D1 is connected in parallel with the switching element $Q_H$. A diode D2 is connected in parallel with the switching element $Q_L$. Moreover, a voltage-resonant capacitor Crv is connected in parallel with the switching element $Q_H$.

Meanwhile, a current-resonant circuit formed of a current-resonant capacitor Cri, a resonant reactor Lr, and a primary winding Lp of a transformer T is connected in parallel with the voltage-resonant capacitor Crv. The voltage-resonant capacitor Crv, the current-resonant capacitor Cri, the resonant reactor Lr, and the primary winding Lp of the transformer T collectively constitute a resonant circuit.

Here, the resonant reactor Lr may be equivalent to leakage inductance of the transformer T. The voltage-resonant capacitor Crv may be equivalent to parasitic capacitance in the switching element $Q_H$. The diodes D1 and D2 connected in parallel with the switching elements may be equivalent to parasitic diodes in the respective switching elements.

The primary winding Lp and a secondary winding Ls are wound so as to generate common-mode voltages. A rectifying-smoothing circuit formed of a diode RC and a smoothing capacitor Co is connected to the secondary winding Ls of the transformer T. The rectifying-smoothing circuit rectifies and smoothes a voltage (an on/off controlled pulse voltage) induced in the secondary winding Ls of the transformer T, and outputs a direct-current output to a load 4.

An output voltage detection circuit 5 is connected to both ends of the smoothing capacitor Co. The output voltage detection circuit 5 detects an output voltage on the smoothing capacitor Co, and outputs an error voltage signal representing a difference between the detected voltage and a reference voltage to a pulse width modulation (PWM) control circuit 2 through a photocoupler PC. The PWM control circuit 2 regulates the voltage on the load 4 to a constant value by generating a PWM signal based on the error voltage signal from the output voltage detection circuit 5 and turning the switching elements $Q_H$ and $Q_L$ on and off alternately through a drive circuit 3 operated in accordance with the PWM signal. In this case, the PWM control circuit 2 turns the switching elements $Q_H$ and $Q_L$ on and off alternately by applying voltages to gates of the switching elements $Q_H$ and $Q_L$ alternately.

Next, operations of the conventional current-resonant type switching power supply will be described with reference to timing charts of FIGS. 2 and 3.

FIG. 2 shows timing charts of signals on respective portions before an input voltage to the conventional switching power supply is reduced. FIG. 3 shows timing charts of signals on the respective portions after the input voltage to the conventional switching power supply is reduced.

Here, in FIGS. 2 and 3, reference code $I_{Lp}$ denotes a current flowing on the primary winding Lp. Reference code $V_{QL}$ denotes a voltage at both ends of the switching element $Q_L$. Reference code $I_{QL}$ denotes a current flowing on the switching element $Q_L$. Reference code $I_{RC}$ denotes a current flowing on the diode RC. Moreover, the resonant reactor Lr is sufficiently smaller than exciting inductance of the primary winding Lr, and the voltage-resonant capacitor Crv is sufficiently smaller than the current-resonant capacitor Cri.

First, when the switching element $Q_L$ is turned on in a time frame T1, a current flows on a path in the order of the positive electrode of the direct-current power source 1, the current-resonant capacitor Cri, the primary winding Lp, the resonant reactor Lr, the switching element $Q_L$, and the negative electrode of the direct-current power source 1. At this time, the current $I_{RC}$ flows from the secondary winding Ls to the diode RC, and the voltage on the secondary winding Ls is rectified. The voltage rectified by the diode RC is smoothed by the capacitor Co, and the direct-current output is supplied to the load 4. Therefore, the current $I_{Lp}$ which is equivalent to superimposition of a resonant current attributable to the current-resonant capacitor Cri and the resonant reactor Lr on an exciting current attributable to resonance among the primary winding Lp, the resonant reactor Lr, and the current-resonant capacitor Cri flows on the primary winding Lp of the transformer T (the same applies to the current $I_{QL}$).

Next, the switching element $Q_L$ remains turned on to charge the capacitor Co in a time frame T2. The diode RC is turned off when the current $I_{RC}$ stops flowing. A resonant current attributable to the current-resonant capacitor Cri, the exciting inductance of the primary winding Lp of the transformer T, and the resonant reactor Lr flows on the primary winding Lp of the transformer T as the current $I_{Lp}$ in the form of a sinusoidal wave (the same applies to the current $I_{QL}$).

Then, the switching element $Q_L$ is turned off and the switching element $Q_H$ is turned on in a time frame T3. At this time, charges accumulated in the exciting inductance of the primary winding Lp of the transformer T, the resonant reactor Lr, and the current-resonant capacitor Cri are discharged by the switching element $Q_H$ as the resonant current attributable to the current-resonant capacitor Cri, the exciting inductance of the primary winding Lp of the transformer T, and the resonant reactor Lr. Then, the current $I_{Lp}$ in the form of the sinusoidal wave flows and a core of the transformer T is reset.

Next, when the input voltage is set low, a boost rate is set high by expanding on-time of the switching element $Q_H$. However, the PWM control circuit 2 is performing PWM control. Therefore, as shown in FIG. 3, on-time of the switching element $Q_L$ becomes shorter than that of the switching element $Q_L$ shown in FIG. 2 as equivalent to the expanded amount of the on-time of the switching element $Q_H$. Accordingly, time for allowing only the resonant current attributable to the current-resonant capacitor Cri, the primary winding Lp of the transformer T, and the exciting inductance of the primary winding Lp of the transformer T to flow (corresponding to the time frame T2) becomes shorter.

When the input voltage is set even lower, time does not allow only the resonant current attributable to the current-resonant capacitor Cri, the primary winding Lp of the transformer T, and the exciting inductance of the primary winding Lp of the transformer T to flow. Therefore, the resonant current attributable to the current-resonant capacitor Cri and the resonant reactor Lr flows on the primary winding Lp of the transformer T, whereby the switching element $Q_L$ on a primary side is turned off when energy is transmitted from the primary side to a secondary side of the transformer T. At this time, a current variation steeper than the resonant current attributable to the current-resonant capacitor Cri and the resonant reactor Lr is generated.

Meanwhile, U.S. Pat. No. 5,808,879 discloses a DC-DC converter. The DC-DC converter includes a half bridge of a semiconductor switch, and is configured to operate a voltage converter formed by connecting a series circuit including a primary winding of a transformer and a capacitor to the half bridge in accordance with PWM control.

Meanwhile, Japanese Unexamined Patent Publication No. 2003-9525 discloses another voltage converter. This voltage converter performs PVVM control by setting a capacity of a capacitor such that a resonance frequency attributable to the capacitor and leakage inductance of a transformer connected in series with a primary winding of the transformer becomes larger than a half value of an operating frequency of a semiconductor switch.

The DC-DC converter disclosed in U.S. Pat. No. 5,808,879 and the voltage converter disclosed in Japanese Unexamined Patent Publication No. 2003-9525 are configured to perform the PWM control by switching on-off states of the switching element on the primary side in a time period when a current is flowing on a diode RC on the secondary side. Accordingly, a current variation steeper than a resonant current attributable to a current-resonant capacitor Cri and a resonant reactor Lr is generated.

As described above, when the resonant type switching power supply configured to connect the semiconductor switch to the half bridge and simultaneously to connect the series circuit including the primary winding of the transformer and the capacitor to the half bridge as shown in FIG. 1 performs the PWM control, a timing for switching the switching element on the primary side takes place in a time period when a diode on the secondary side is conducted. Moreover, the current on the primary winding of the transformer (the current flowing on the switching element on the primary side) and a diode current sharply change as compared to the variation in the resonant current, which result in noise generation.

Moreover, the DC-DC converter disclosed in U.S. Pat. No. 5,808,879 and the voltage converter disclosed in Japanese Unexamined Patent Publication No. 2003-9525 are configured to switch the switching element on the primary side in a time period when energy is supplied from the primary side to the secondary side and when the current is flowing on the diode on the secondary side by the resonant current attributable to the resonant reactor and the current-resonant capacitor. At this time, the resonant current attributable to the exciting inductance of the primary winding of the transformer and the current-resonant capacitor as well as the resonant current attributable to the leakage inductance and the current-resonant capacitor are flowing on the switching element on the primary side. Therefore, large variations occur in the current on the primary winding of the transformer (the current flowing on the switching element on the primary side) and the diode current, which result in noise generation.

SUMMARY OF THE INVENTION

An object of the present invention is to provide a current-resonant type switching power supply capable of suppressing an increase in noise attributable to input and output variations and thereby achieving high efficiency.

The present invention provides a switching power supply including a first series circuit formed by connecting first and second switching elements respectively in series at both ends of a direct-current power source, a second series circuit formed by connecting a resonant capacitor, a resonant reactor, and a primary winding of a transformer in series at both ends of the first switching element, a rectifying-smoothing circuit configured to rectify and smooth a voltage generated on a secondary winding of the transformer, and a control circuit configured to turn the first and second switching elements on and off alternately based on an output voltage from the rectifying-smoothing circuit. Here, the control circuit sets an on-period of the second switching element to a predetermined time period longer than a half value of a cycle of a resonant current attributable to the resonant reactor and the resonant capacitor, and controls an on-period of the first switching element based on the output voltage from the rectifying-smoothing circuit.

According to the present invention, the control circuits sets the on-period of the second switching element longer than the half value of the cycle of the resonant current attributable to the resonant reactor and the current-resonant capacitor. Therefore, the switching element on the primary side is switched after a rectifying element on the secondary side is duly turned off even when an on-period of the rectifying element is changed by input and output variations. In other words, the switching element on the primary side is switched after the resonant current attributable to the current-resonant capacitor and the resonant reactor, which is transmitted from the primary side to the secondary side, becomes equal to zero. Therefore, it is possible to suppress an increase in noise attributable to input and output variations and thereby to achieve high efficiency.

Moreover, since the cycle of the resonant current attributable to the resonant reactor and the current-resonant capacitor is fixed, an on-width (the on-period) of the first switching element is fixed to the predetermined time period longer than the half value of the cycle of the resonant current. Accordingly, it is only necessary to adjust an on-width of the second switching element. In this way, it is possible to increase a control range by changing a switching frequency.

Meanwhile, it is also possible to connect the first switching element to a positive electrode of the direct-current power source and to connect the second switching element to a negative electrode of the direct-current power source.

According to the present invention, the first switching element is connected to the positive electrode of the direct-current power source while the second switching element is connected to the negative electrode of the direct-current power source, and the on-width of the second switching element is fixed. For this reason, it is possible to generate power for driving the first switching element reliably in a time period when the second switching element is turned on. Accordingly, it is not necessary to prepare a discrete high-voltage power source required for driving the first switching element, which is connected to the positive electrode of the direct-current power source.

Meanwhile, the control circuit may include a first switching element control unit configured to turn the first switching element on in the predetermined time period when a charged voltage of a capacitor transits from a first threshold to a second threshold by charging the capacitor using a current flowing in response to the output voltage, and a second switching element control unit configured to discharge charges in the capacitor from the second threshold to the first threshold and to turn the second switching element on in a time period when the charged voltage of the capacitor transits from the first threshold to the second threshold by charging the capacitor using a predetermined current.

According to the present invention, the control circuit turns the first switching element on in the time period when the charged voltage of the capacitor transits from the first threshold to the second threshold by charging the capacitor using the current flowing in response to the output voltage, and turns the second switching element on in the time period when the charged voltage of the capacitor transits from the first threshold to the second threshold by charging the capacitor using the predetermined current by applying the single capacitor. In this way, it is possible to fix the on-period of the second switching element and to control the on-period of the first switching element variably.

Meanwhile, the control circuit may include a first switching element control unit configured to turn the first switching element on in a time period when a charged voltage of a first capacitor transits from a voltage at a start of charging to a first predetermined voltage by charging the first capacitor using a current flowing in response to the output voltage, and a second switching element control unit configured to turn the second switching element on in the predetermined time period when a charged voltage of a second capacitor transits from a voltage at a start of charging to a second predetermined voltage by charging the second capacitor using a predetermined current.

According to the present invention, the on-period of the second switching element is fixed by use of the second switching element control unit and the second capacitor. Meanwhile, it is possible to control the on-period of the first switching element variably by use of the first switching element control unit and the first capacitor, and to control an off-period of the second switching element variably as well.

DESCRIPTION OF THE PREFERRED EMBODIMENTS

Now, embodiments of switching power supply according to the present invention will be described in detail with reference to the accompanying drawings.

The present invention is configured to switch a switching element on a primary side after a diode is duly turned off irrespective of input and output conditions by setting an on-period of a second switching element larger than a half value of a cycle of a resonant current attributable to a resonant reactor and a current-resonant capacitor. In other words, the present invention in configured to switch the switching element on the primary side after the resonant current attributable to the current-resonant capacitor and the resonant reactor to be transmitted from the primary side to a secondary side becomes equal to zero. In this way, the present invention suppresses an increase in noise attributable to input and output variations and thereby achieves high efficiency.

First Embodiment

Figure 1:
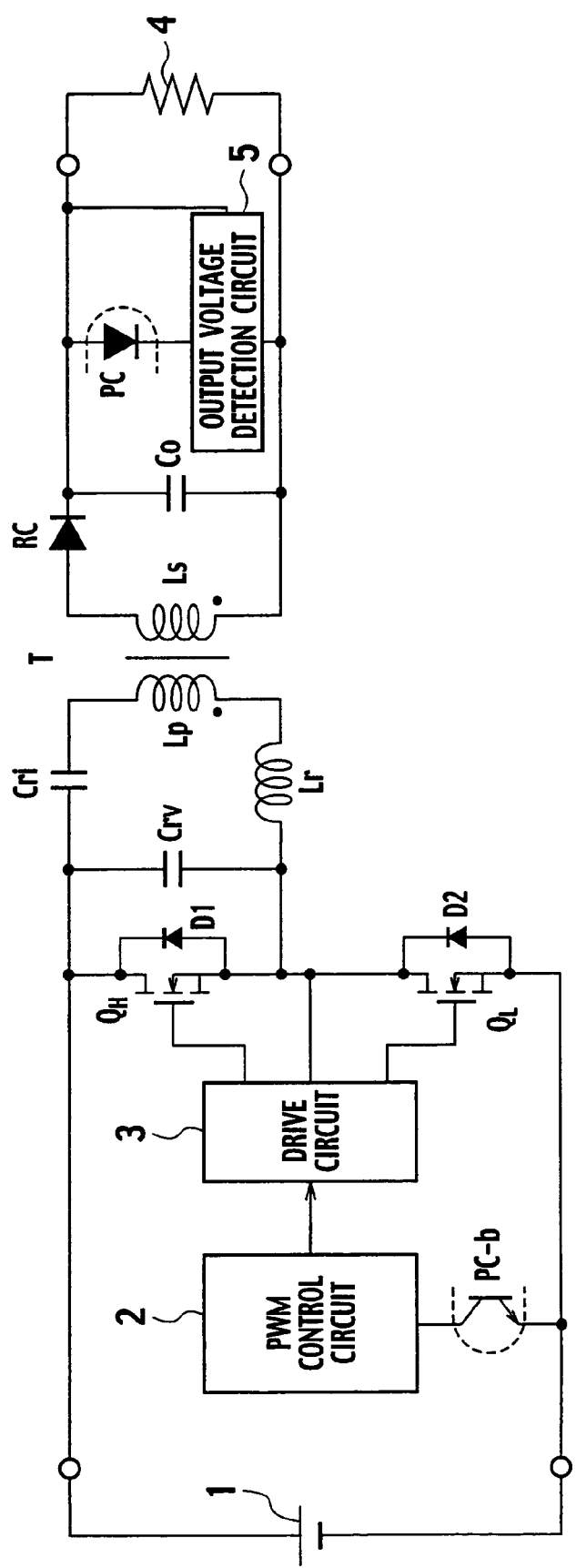
FIG. 1 is a circuit block diagram of a conventional switching power supply.
Figure 4:
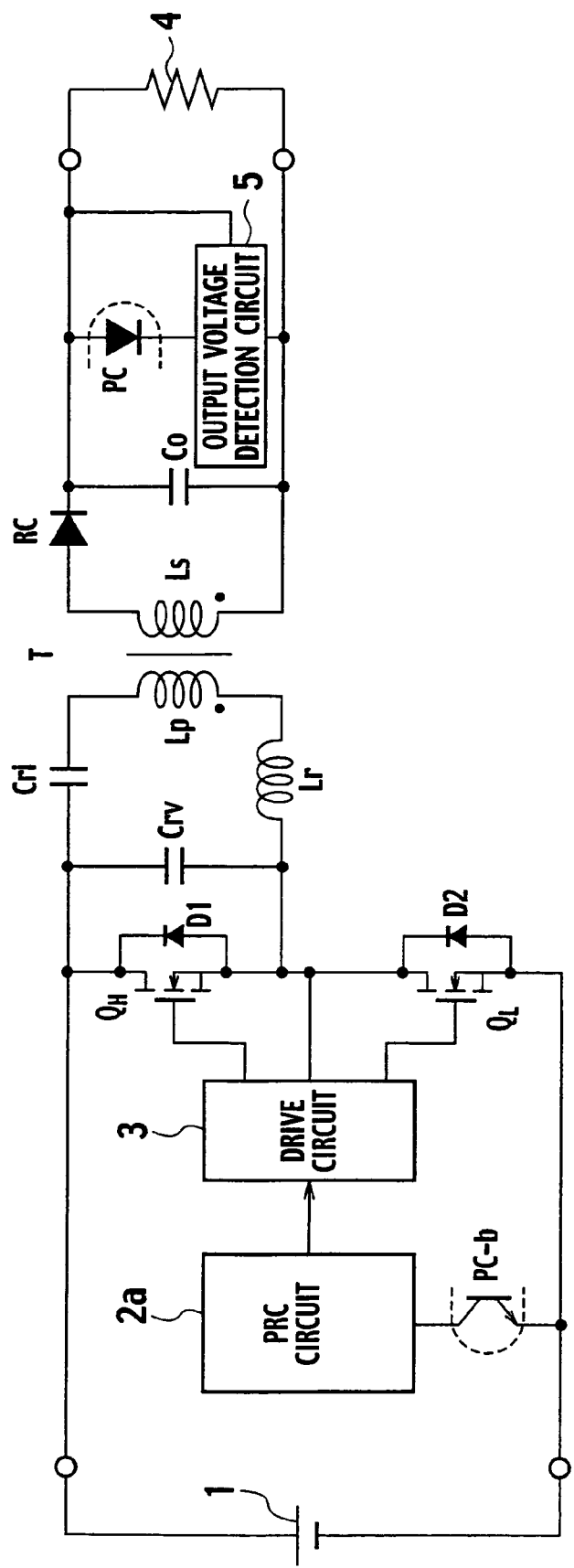
FIG. 4 is a circuit block diagram of a switching power supply according to a first embodiment of the present invention.

FIG. 4 is a circuit block diagram of a switching power supply according to a first embodiment. The switching power supply of the first embodiment is configured to apply a pulse ratio control (PRC) circuit 2a instead of the PWM control circuit 2 in the conventional switching power supply shown in FIG. 1. Other features shown in FIG. 4 are identical to the conventional configuration shown in FIG. 1. The same constituents are designated by the same reference numerals and detailed descriptions of the same constituents will be omitted. Accordingly, only the configuration of the control circuit 2a will be described herein.

The conventional PWM control circuit 2 performs PWM control. On the contrary, the PRC circuit 2a of the first embodiment performs PRC. The PRC means control to fix an on-width of a switching element and meanwhile to vary an off-width thereof. Alternatively, the PRC may control to fix the off-width of the switching element and meanwhile to vary the on-width thereof. Such control is used in a flyback converter, for example.

Figure 5:
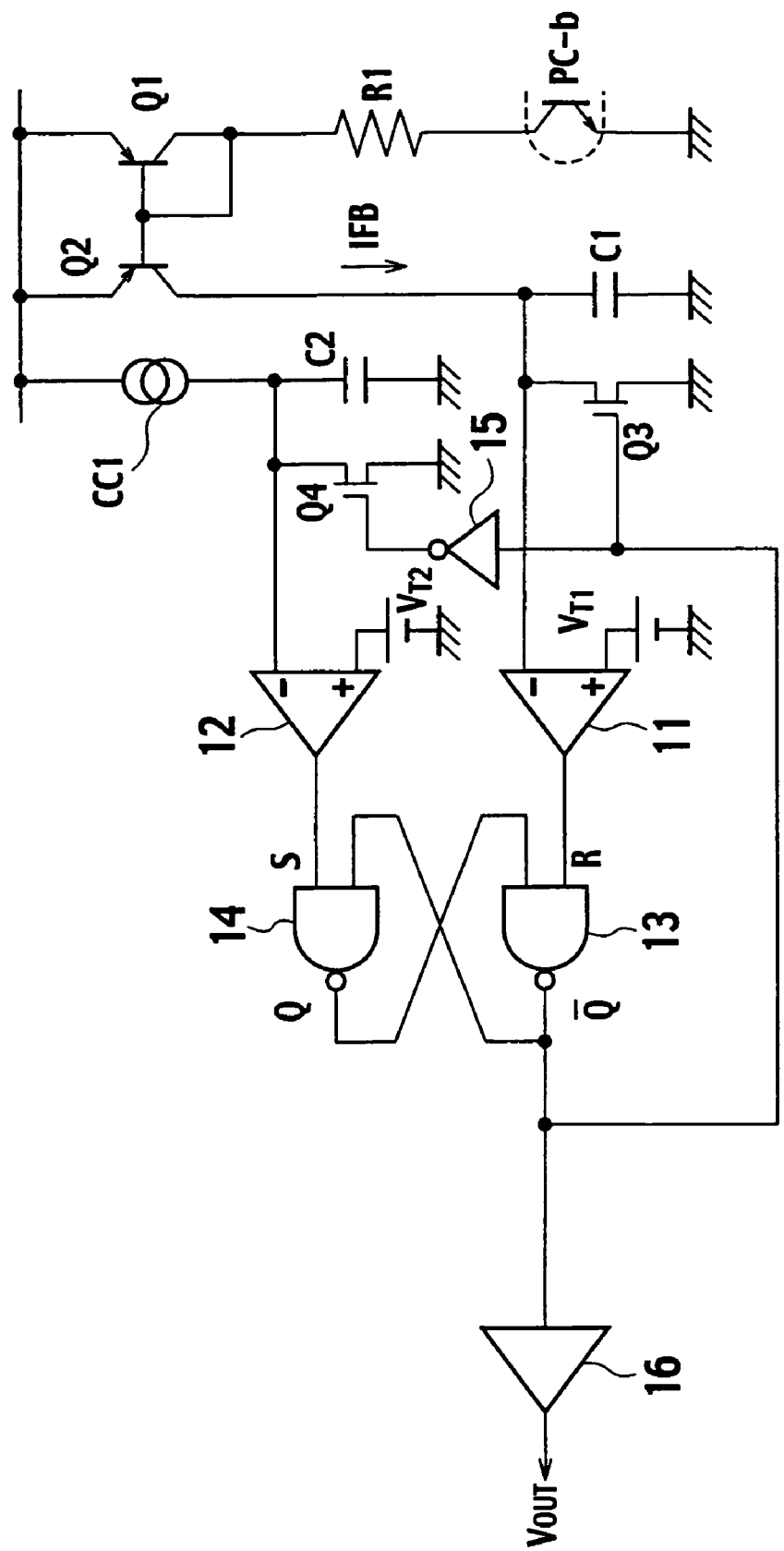
FIG. 5 is a circuit diagram showing an example of a pulse ratio control (PRC) circuit for generating a pulse signal having a fixed on-width and a variable off-width.

FIG. 5 is a circuit diagram showing an example of the PRC circuit for generating a pulse signal having a fixed on-width and a variable off-width. The switching power supply of the first embodiment is configured to fix an on-width of a switching element $Q_L$ and to vary an off-width of the switching element $Q_L$. Therefore, the PRC circuit 2a as shown in FIG. 5 is used therein.

In FIG. 5, emitters of transistors Q1 and Q2 are connected to an unillustrated power source. Bases of the transistors Q1/Q2, and a collector of the transistor Q1 are connected together. The transistors Q1 and Q2 collectively constitute a current mirror circuit.

A collector of the transistor Q1 is connected to one end of a photocoupler PC-b through a resistor R1, and another end of the photocoupler PC-b is grounded. A collector of the transistor Q2 is grounded though a capacitor C1. A field-effect transistor (FET) Q3 is connected in parallel with the capacitor C1.

A comparator 11 is configured to input a voltage charged in the capacitor C1 to a inverting terminal and to input a first threshold $V_{T1}$ to a noninverting terminal thereof. When the voltage on the capacitor C1 falls below the first threshold $V_{T1}$, the comparator 11 outputs a high (H) level to a reset terminal R of a NAND circuit 13. When the voltage on the capacitor C1 is equal to or above the first threshold $V_{T1}$, the comparator 11 outputs a low (L) level to the reset terminal R of the NAND circuit 13.

A capacitor C2 is connected in series with a current source CC1, and an FET Q4 is connected in parallel with the capacitor C2.

A comparator 12 is configured to input a voltage charged in the capacitor C2 to a inverting terminal and to input a second threshold $V_{T2}$ to a noninverting terminal thereof. When the voltage on the capacitor C2 falls below the second threshold $V_{T2}$, the comparator 12 outputs the H level to a set terminal S of a NAND circuit 14. When the voltage on the capacitor C2 is equal to or above the second threshold $V_{T2}$, the comparator 12 outputs the L level to the set terminal S of the NAND circuit 14.

The NAND circuits 13 and 14 collectively constitute a reset-set (RS) flip-flop. The NAND circuit 13 inputs an output from the comparator 11 and an output Q from the NAND circuit 14, and outputs an inverted output of the output Q. The NAND circuit 14 inputs an output from the comparator 12 and the output from the NAND circuit 13 (the inverted output of the output Q), and outputs the output Q.

The output from the NAND circuit 13 is connected to a gate of the FET Q3. The gate of the FET Q3 is connected to a gate of the FET Q4 through a NOT circuit 15. The NOT circuit 15 inverts the input to the gate of the FET Q3 and outputs to the gate of the FET Q4. The output from the NAND circuit 13 is outputted to a drive circuit 3 through a buffer 16 as a PRC output signal $V_{OUT}$.

The transistors Q1/Q2, the photocoupler PC-b, the capacitor C1, the transistor Q3, and the comparator 11 collectively constitute a first switching element control unit of the present invention. The constant current source CC1, the capacitor C2, the transistor Q4, the comparator 12, and the NOT circuit 15 collectively constitute a second switching element control unit of the present invention.

Figure 6:
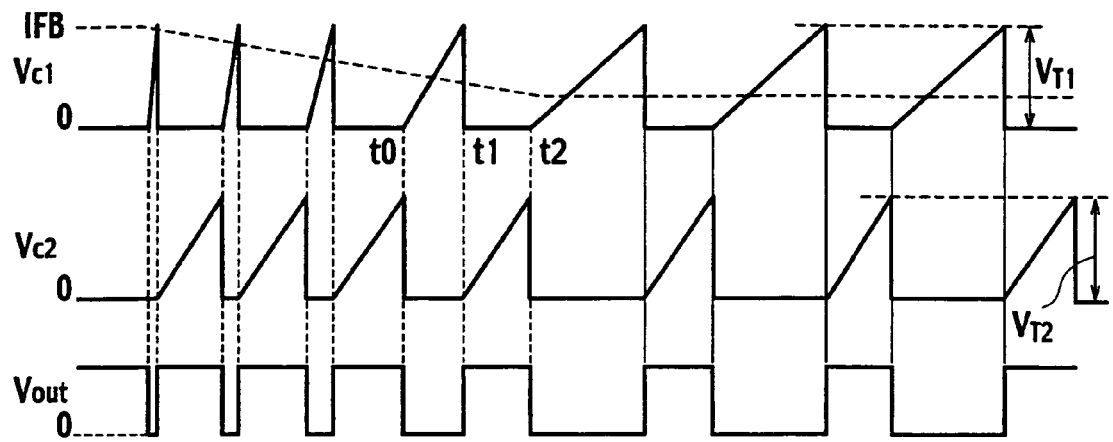
FIG. 6 shows timing charts of operating waveforms of respective portions in the PRC circuit shown in FIG. 5.

Next, operations of the PRC circuit 2a according to the first embodiment of the present invention will be described. FIG. 6 shows timing charts of operating waveforms of respective portions in the PRC circuit shown in FIG. 5.

First, an output voltage detection circuit 5 detects an output voltage and transmits an error signal representing a difference between the detected output voltage and a reference voltage to the control circuit 2a through a photocoupler PC.

In the control circuit 2a, the error signal of the output voltage flows on the photocoupler PC-b. Then, a current IFB which is identical to a current flowing on the photocoupler PC-b flows on the capacitor C1 through the transistor Q2 by way of the current mirror circuit which is composed of the transistors Q1/Q2 and the resistor R1. In this way, the capacitor C1 is gradually charged and a voltage $V_{C1}$ is linearly increased (as shown in a time interval from $t_0$ to $t_1$ in FIG. 6, for example).

At this time, the voltage on the capacitor C1 is smaller than the first threshold $V_{T1}$. Accordingly, the output from the comparator 11 is at the H level. The voltage on the capacitor C2 becomes equal to the second threshold $V_{T2}$ at the time $t_0$. Accordingly, the output from the comparator 12 is at the L level. In this time, the reset-set flip-flop is set. As a consequence, the output Q from the NAND circuit 14 is set to the H level while the output from the NAND circuit 13 is set to the L level, and the FET Q3 is therefore turned off As the FET Q3 is turned off, the FET Q4 is turned on through the NOT circuit 15.

Moreover, since the charges in the capacitor C2 are discharged through the FET Q4, a voltage $V_{C2}$ on the capacitor C2 is equal to zero. Meanwhile, the L level representing the output from the NAND circuit 13 is outputted to the drive circuit 3 through the buffer 16 as the PRC output signal $V_{OUT}$.

Next, when the voltage $V_{C1}$ on the capacitor C1 becomes equal to the first threshold $V_{T1}$ at the time $t_1$, for example, the output from the comparator 11 is shifted from the H level to the L level. Meanwhile, the output Q from the NAND circuit 14 is set to the L level while the output from the NAND circuit 13 is set to the H level. Accordingly, the FET Q3 is turned on. As the FET Q3 is turned on, the FET Q4 is turned off through the NOT circuit 15. Meanwhile, the H level of the output from the NAND circuit 13 is outputted to the drive circuit 3 through the buffer 16 as the PRC output signal $V_{OUT}$.

In the meantime, the capacitor C2 is gradually charged by a predetermined current from the constant current source CC1 and the voltage $V_{C2}$ of the capacitor C2 is linearly increased in a time interval from $t_1$ to $t_2$, for example. At this time, the charges in the capacitor C1 are discharged through the FET Q3. Accordingly, the voltage $V_{C1}$ on the capacitor C1 is equal to zero. Meanwhile, the output from the comparator 11 is set to the H level.

Next, when the voltage $V_{C2}$ on the capacitor C2 becomes equal to the second threshold $V_{T2}$ at the time $t_2$, for example, the output from the comparator 12 is shifted from the H level to the L level. Meanwhile, the output Q from the NAND circuit 14 is set to the H level while the output from the NAND circuit 13 is set to the L level. Accordingly, the FET Q3 is turned off. As the FET Q3 is turned off, the FET Q4 is turned on through the NOT circuit 15. Meanwhile, the L level of the output from the NAND circuit 13 is outputted to the drive circuit 3 through the buffer 16 as the PRC output signal $V_{OUT}$. Here, the output from the comparator 12 is set to the H level.

Note that FIG. 6 shows the case in which the current IFB is reduced with time. FIG. 6 shows an aspect that charging time (such as the time interval from $t_0$ to $t_1$) for accumulating certain charges in the capacitor C1 becomes longer along with reduction in the current IFB.

The above-described operations will be repeated. Here, the output from the NAND circuit 13 constituting the flip-flop, i.e. the PRC output signal $V_{OUT}$, is set to the L level in the time interval (such as the time interval from $t_0$ to $t_1$) for charging the voltage $V_{C1}$ on the capacitor C1 from a voltage at a start of charging until reaching the first threshold $V_{T1}$ in response to the current IFB corresponding to the current flowing on the photocoupler PC. Meanwhile, the PRC output signal $V_{OUT}$ is set to the H level in the time interval (such as the time interval from $t_1$ to $t_2$) for charging the voltage $V_{C2}$ on the capacitor C2 from a voltage at a start of charging until reaching the second threshold $V_{T2}$ by use of the constant current source CC1.

Therefore, the time period of PRC output signal $V_{OUT}$ at the H level is fixed while the time period thereof at the L level becomes variable with the current flowing on the photocoupler PC (the error signal of the output voltage). As a result, the PRC output signal $V_{OUT}$ becomes a pulse signal including the H level having a pulse width of a fixed value and the L level having a variable pulse width.

The PRC circuit $2a$ turns the switching element $Q_L$ on by use of the H level of the PRC output signal $V_{OUT}$, and turns a switching element $Q_H$ on by use of the L level of the PRC output signal $V_{OUT}$. Moreover, the PRC circuit $2a$ sets an on-period of the switching element $Q_L$ greater than a half value Ta/2 of a cycle Ta of a resonant current attributable to a resonant reactor Lr and a current-resonant capacitor Cri. Here, the cycle Ta is expressed by the following formula (1):

$$Ta = 1/2 \cdot \pi \cdot (Lr \cdot Cri)^{1/2} \quad (1)$$

In reality, dead time is provided, allowing both of the switching elements to be turned off at the time of switching on-and-off states of the switching elements $Q_L$ and $Q_H$.

Next, operations of the switching power supply configured to perform the PRC on the switching elements $Q_L$ and $Q_H$ by use of the control circuit $2a$ shown in FIG. 5 will be described in detail with reference to timing charts of the respective portions shown in FIG. 7.

Figure 7:
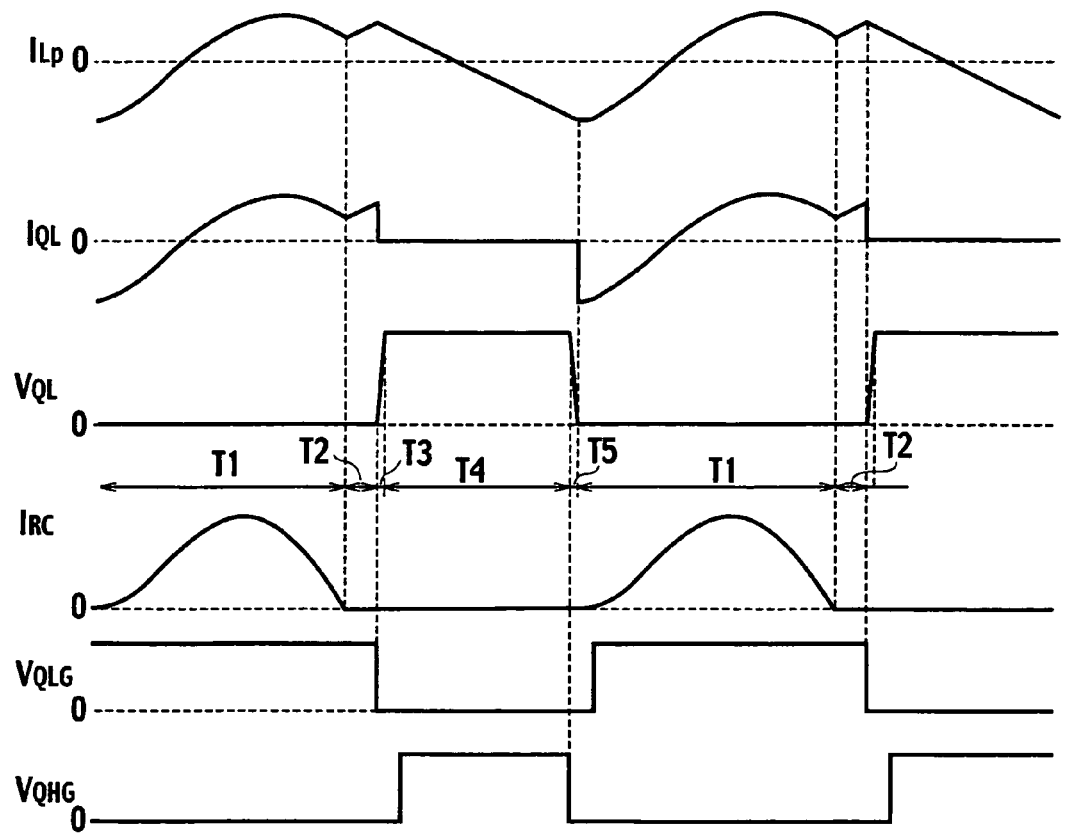
FIG. 7 shows timing charts of signals on respective portions of the switching power supply of the first embodiment.

In FIG. 7, reference code $I_{Lp}$ denotes a current flowing on a primary winding Lp. Reference code $V_{QL}$ denotes a voltage at both ends of the switching element $Q_L$. Reference code $I_{QL}$ denotes a current flowing on the switching element $Q_L$. Reference code $I_{RC}$ denotes a current flowing on a diode RC. Reference code $V_{QLG}$ denotes a gate voltage signal to be applied to a gate of the switching element $Q_L$. Reference code $V_{QHG}$ denotes a gate voltage signal to be applied to a gate of the switching element $Q_H$.

Here, the gate voltage signal $V_{QLG}$ is identical to the PRC output signal $V_{OUT}$ shown in FIG. 5, and the gate voltage signal $V_{QHG}$ is generated based on the PRC output signal $V_{OUT}$ shown in FIG. 5.

First, in a time frame T1, the switching element $Q_L$ is turned on by the gate voltage signal $V_{QLG}$ and the switching element $Q_H$ is turned off by the gate voltage signal $V_{QHG}$. At this time, a current flows on a path in the order of a positive electrode of a direct-current power source 1, the current-resonant capacitor Cri, the primary winding Lp, the resonant reactor Lr, the switching element $Q_L$, and a negative electrode of the direct-current power source 1.

The current $I_{RC}$ flows from a secondary winding Ls to the diode RC, and a voltage on the secondary winding Ls is rectified. A voltage rectified by the diode RC is smoothed by a capacitor Co, and a direct-current output is supplied to a load 4. Therefore, the current $I_{Lp}$ which is equivalent to superimposition of a resonant current attributable to the current-resonant capacitor Cri and the resonant reactor Lr on an exciting current attributable to resonance among the primary winding Lp, the resonant reactor Lr, and the current-resonant capacitor Cri flows on the primary winding Lp of a transformer T (the same applies to the current $I_{QL}$).

In a time frame T2, the switching element $Q_L$ is turned on and the switching element $Q_H$ is turned off. The diode RC is turned off when the capacitor Co is fully charged and the current IRC stops flowing. A resonant current attributable to the current-resonant capacitor Cri, exciting inductance of the primary winding Lp of the transformer T, and the resonant reactor Lr flows on the primary winding Lp of the transformer T as the current $I_{Lp}$ in the form of a sinusoidal wave (the same applies to the current $I_{QL}$).

In a time frame T3, the switching element $Q_H$ remains turned off and the switching element $Q_L$ is turned off by the gate voltage signal $V_{QLG}$. At this time, a voltage on a voltage-resonant capacitor Crv is reduced by resonance attributable to the resonant reactor Lr and the voltage-resonant capacitor Crv, and the voltage $V_{QL}$ on the switching element $Q_L$ is thereby increased.

In a time frame T4, the switching element $Q_H$ is turned on by the gate voltage signal $V_{QHG}$ and the switching element $Q_L$ remains turned off. At this time, a resonant current attributable to the exciting inductance of the primary winding Lp of the transformer T and the current-resonant capacitor Cri flows in a gradually reduced manner through a diode D1 in the first place.

Thereafter, charges accumulated in the exciting inductance of the primary winding Lp of the transformer T, the resonant reactor Lr, and the current-resonant capacitor Cri are discharged by the switching element $Q_H$ as the resonant current attributable to the current-resonant capacitor Cri, the exciting inductance of the primary winding Lp of the transformer T, and the resonant reactor Lr. Specifically, the direction of the current is inverted, and the current flows in the reverse direction through the switching element $Q_H$ in a gradually increased manner. By this current $I_{Lp}$ in the form of the gentle sinusoidal wave, the transformer T discharges exciting energy and is then reset.

In a time frame T5, the switching element $Q_H$ is turned off by the gate voltage signal $V_{QHG}$ and the switching element $Q_L$ is also turned off. At this time, the voltage on the voltage-resonant capacitor Crv is increased by resonance attributable to the voltage-resonant capacitor Crv, the exciting inductance of the primary winding Lp of the transformer T, and the resonant reactor Lr. Thereafter, the switching element $Q_L$ is turned on and the condition returns to the state in the time frame T1.

The above-described operations are repeated, and a direct-current voltage from the direct-current power source 1 is converted into another direct-current voltage. The on-period of the switching element $Q_L$ is set to a constant value which is greater than the half value Ta/2 of the cycle Ta of the resonant current attributable to the resonant reactor Lr and the current-resonant capacitor Cri by the PRC circuit $2a$ shown in FIG. 5. An on-time of the switching element $Q_H$ is adjusted in accordance with the error signal by the PRC circuit $2a$ shown in FIG. 5, and an output voltage is thereby controlled.

Here, the on-period of the switching element $Q_L$ is equivalent to a total time period of the time frames T1 and T2, which corresponds to an H level period of the gate voltage signal $V_{QLG}$. The on-period of the switching element $Q_H$ is equal to the time frame T4, which corresponds to an H level period of the gate voltage signal $V_{QHG}$.

Figure 2:
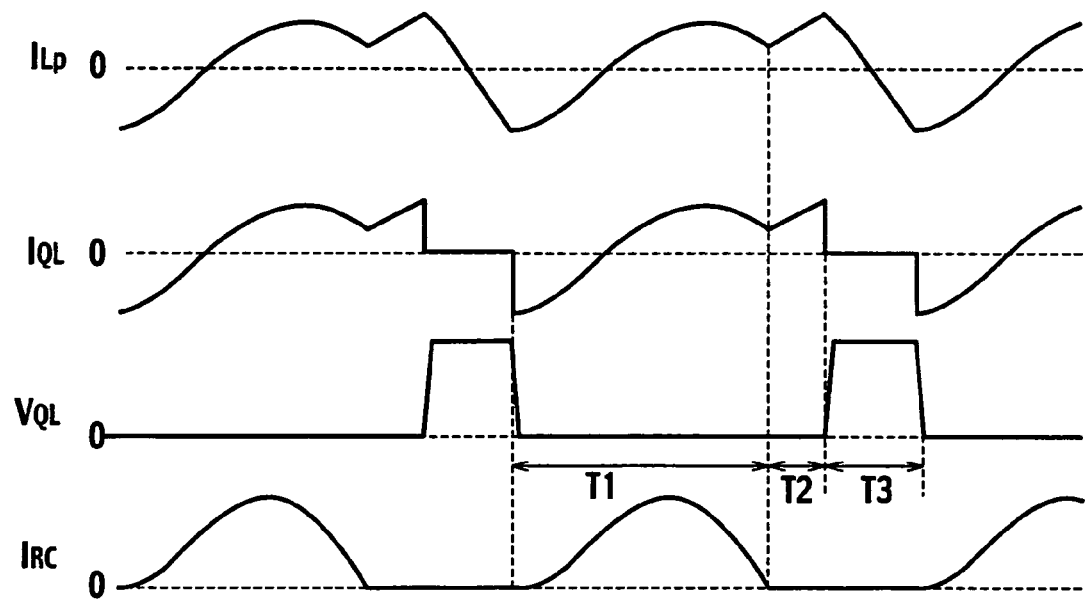
FIG. 2 shows timing charts of signals on respective portions before an input voltage to the conventional switching power supply is reduced.
Figure 8:
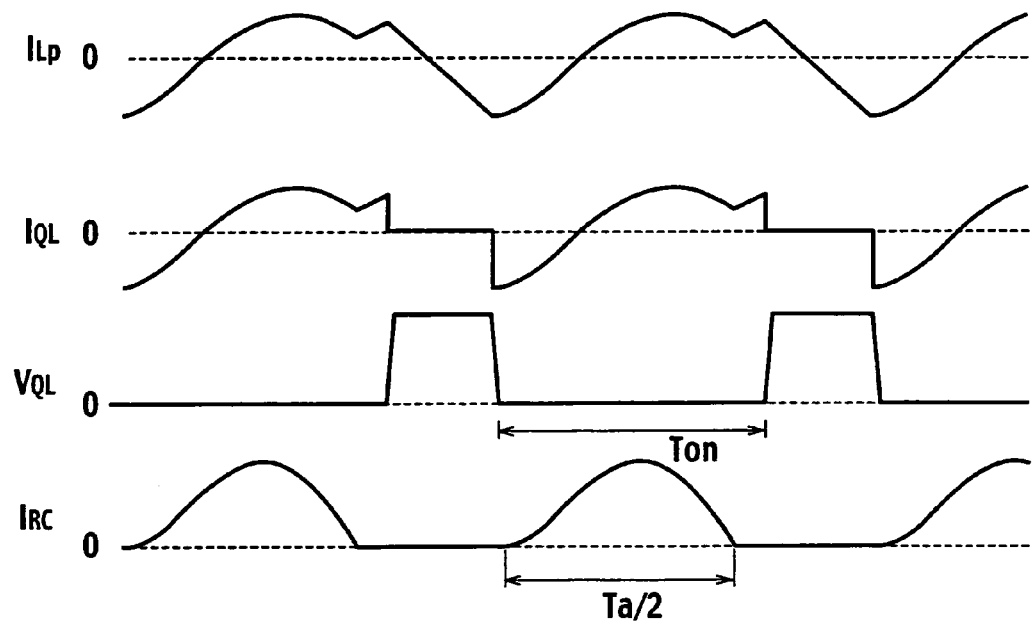
FIG. 8 shows timing charts of signals on the respective portions before an input voltage to the switching power supply of the first embodiment is reduced.
Figure 9:
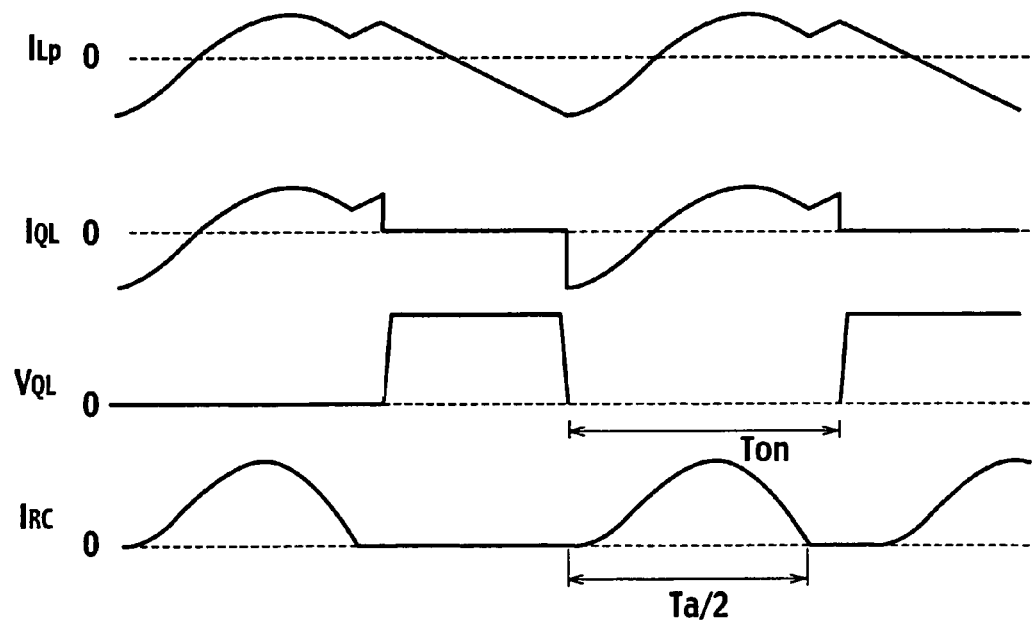
FIG. 9 shows timing charts of signals on the respective portions after the input voltage to the switching power supply of the first embodiment is reduced.

FIG. 8 shows timing charts of signals on the respective portions before an input voltage to the switching power supply of the first embodiment is reduced, which corresponds to FIG. 2 of the conventional example. FIG. 9 shows timing charts of signals on the respective portions after the input voltage to the switching power supply of the first embodiment is reduced, which corresponds to FIG. 3 of the conventional example.

Figure 3:
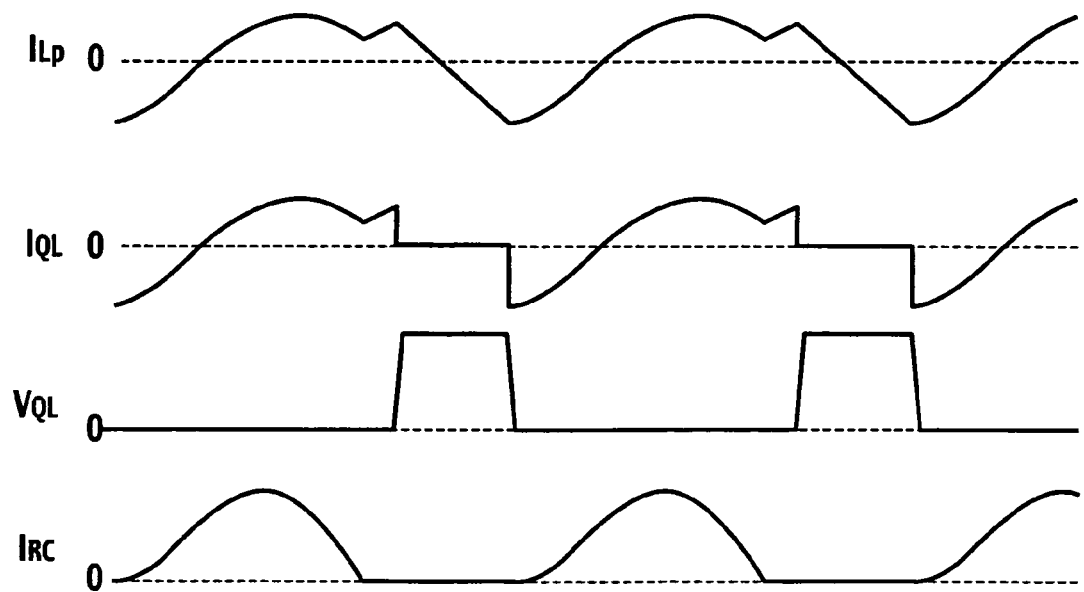
FIG. 3 shows timing charts of signals on the respective portions after the input voltage to the conventional switching power supply is reduced.

In FIG. 3, the portion corresponding to the time frame T3 in FIG. 7 becomes shorter when the input voltage is reduced. When the input voltage is reduced further, this time frame T3 disappears in FIG. 3.

On the contrary, in FIGS. 8 and 9 of the first embodiment, an on-period Ton of the switching element $Q_L$ is fixed and set to the constant value greater than the half value Ta/2 of the cycle Ta of the resonant current attributable to the resonant reactor Lr and the current-resonant capacitor Cri. Accordingly, the portion corresponding to the time frame T3 shown in FIG. 7 remains the same even when a condition of the input voltage is altered. Meanwhile, the on-period of the switching element $Q_H$ becomes longer when the input voltage is reduced. Since the current flowing on the primary winding Lp is equal, the energy transmitted to the output on the secondary side becomes the same when the switching element $Q_L$ is turned on.

As described above, the switching power supply of the first embodiment is configured to fix the on-width of the switching element $Q_L$ to a time period longer than the half value of the cycle of the resonant current attributable to the current-resonant capacitor Cri and the resonant reactor Lr. Therefore, even when the on-period of the diode RC on the secondary side is changed by input and output variations, it is possible to turn the switching element $Q_L$ off after the diode RC on the secondary side is duly turned off, or in other words, after the resonant current attributable to the current-resonant capacitor Cri and the resonant reactor Lr to be transmitted from the primary side to the secondary side becomes equal to zero.

Accordingly, the current does not cause a current variation faster than the resonant frequency. In this way, it is possible to reduce noise generation and stress on semiconductor components. Therefore, it is possible to suppress an increase in noise attributable to input and output variations and thereby to achieve high efficiency.

Moreover, an exciting current is only supplied to the portion corresponding to the time frame T3 shown in FIG. 7. Therefore, efficiency is degraded if this portion is excessively long. Since the on-width of the switching element $Q_L$ is fixed in the first embodiment, it is possible to reduce degradation of the efficiency by setting the on-width to an optimal time period.

Figure 10:
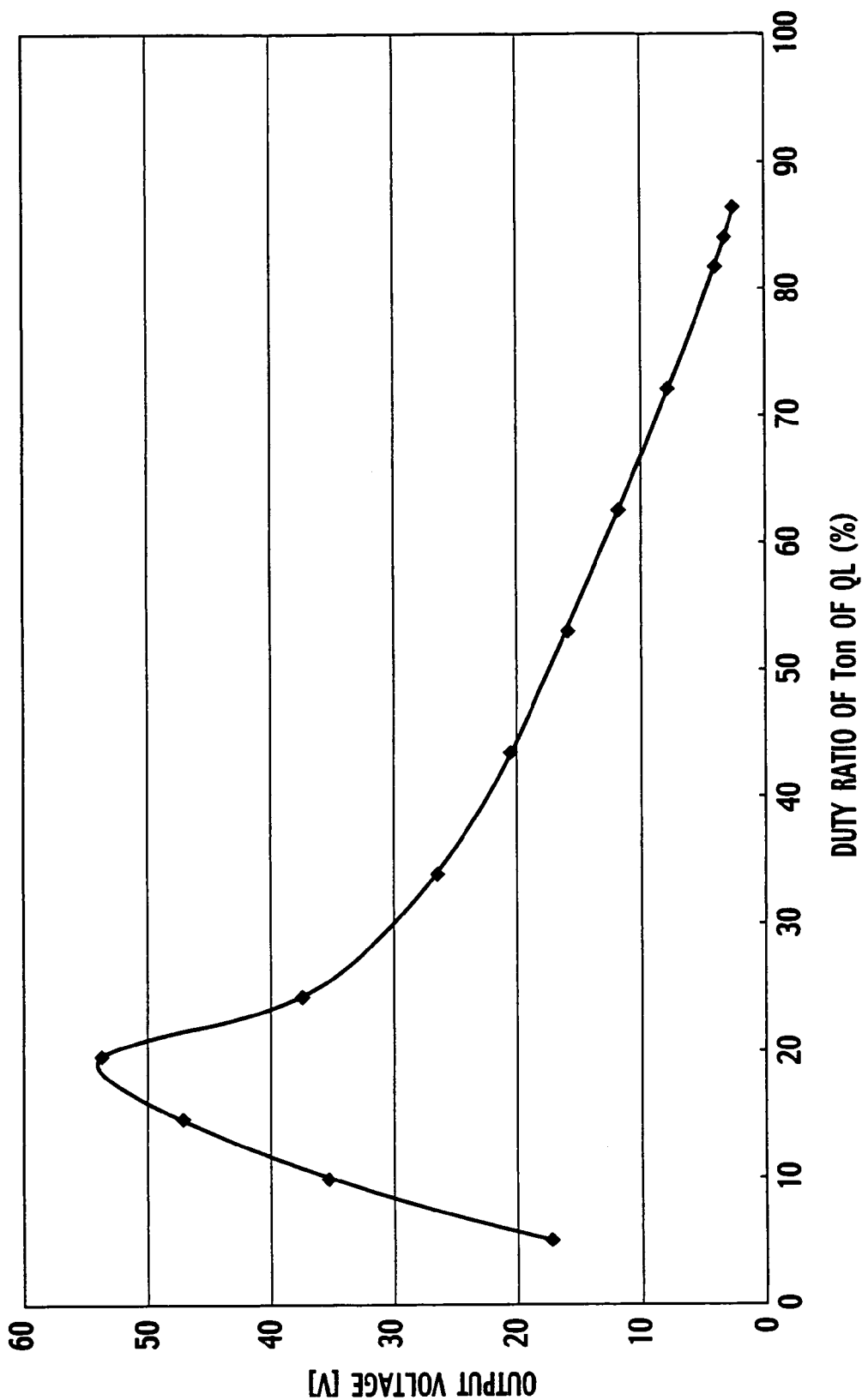
FIG. 10 is a graph showing a relation between a duty ratio of a switching element $Q_L$ and an output voltage under pulse ratio control.
Figure 11:
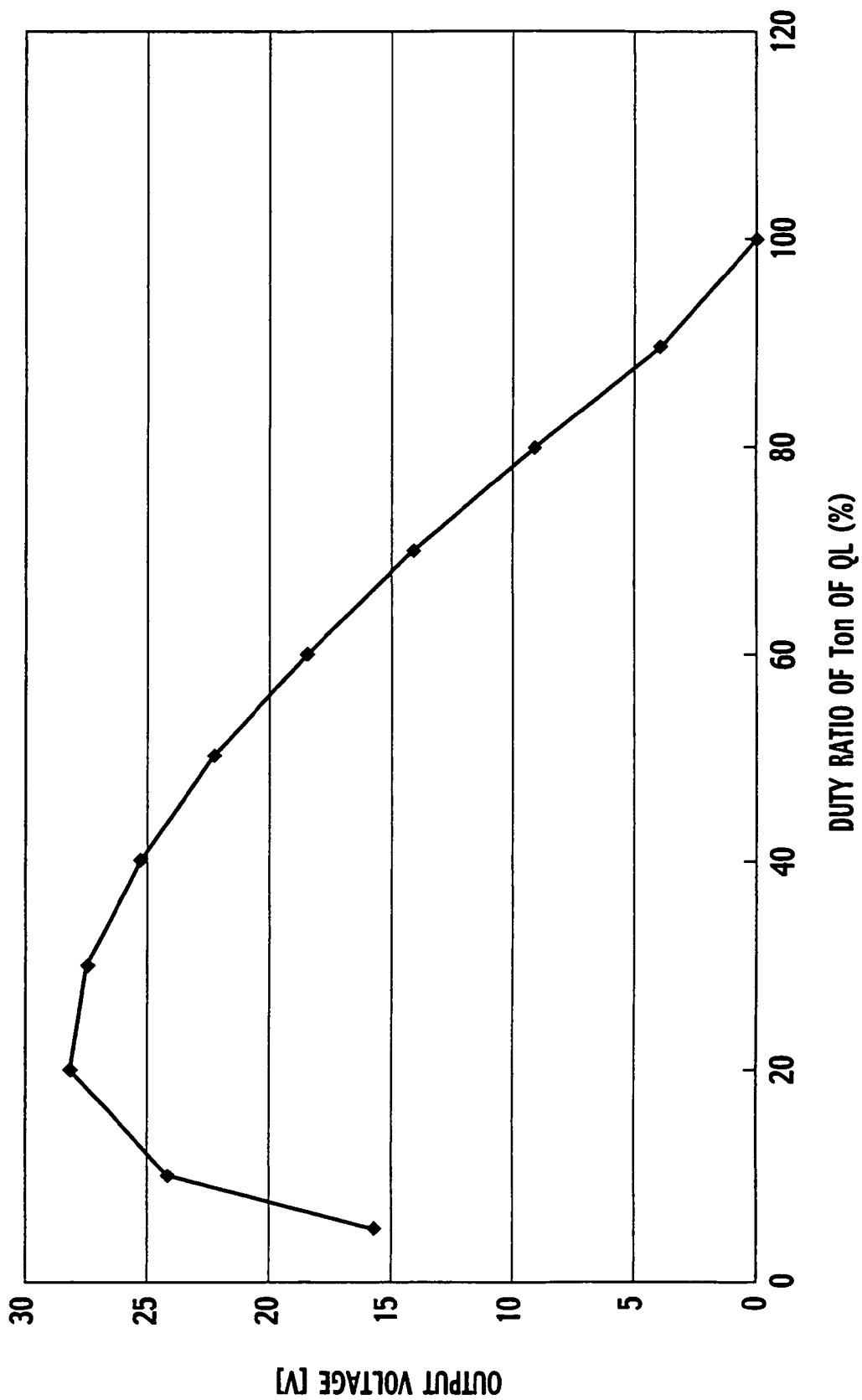
FIG. 11 is a graph showing a relation between the duty ratio of the switching element $Q_L$ and the output voltage under pulse width modulation control.

FIG. 10 is a graph showing a relation between a duty ratio of the switching element $Q_L$ and the output voltage under the PRC. FIG. 11 is a graph showing a relation between the duty ratio of the switching element $Q_L$ and the output voltage under the PWM control.

FIGS. 10 and 11 show examples of simulating the relations between the duty ratio of the switching element $Q_L$ and the output voltage in which the input voltage and an output current are set constant by use of the PRC method of the first embodiment and the conventional PWM control method. The duty is a ratio between the on-period of the switching element $Q_L$ and a switching cycle.

In the case of the PRC method according to the first embodiment shown in FIG. 10, the output voltage relative to the variation in the duty ratio ranges approximately from 2 V to 55 V. In the case of the conventional PWM control method shown in FIG. 11, the output voltage relative to the variation in the duty ratio ranges approximately from 2 V to 27 V. Therefore, the output voltage relative to the variation in the duty ratio according to the PRC method of the first embodiment has a control range which is twice as large as that of the conventional PWM control method. Specifically, the PRC circuit 2a fixes the on-period of the switching element $Q_L$ to the predetermined time period greater than the half value of the cycle Ta of the resonant current and adjusts the on-width of the switching element $Q_H$. In this way, it is possible to expand the control range by changing the switching frequency.

Figure 12:
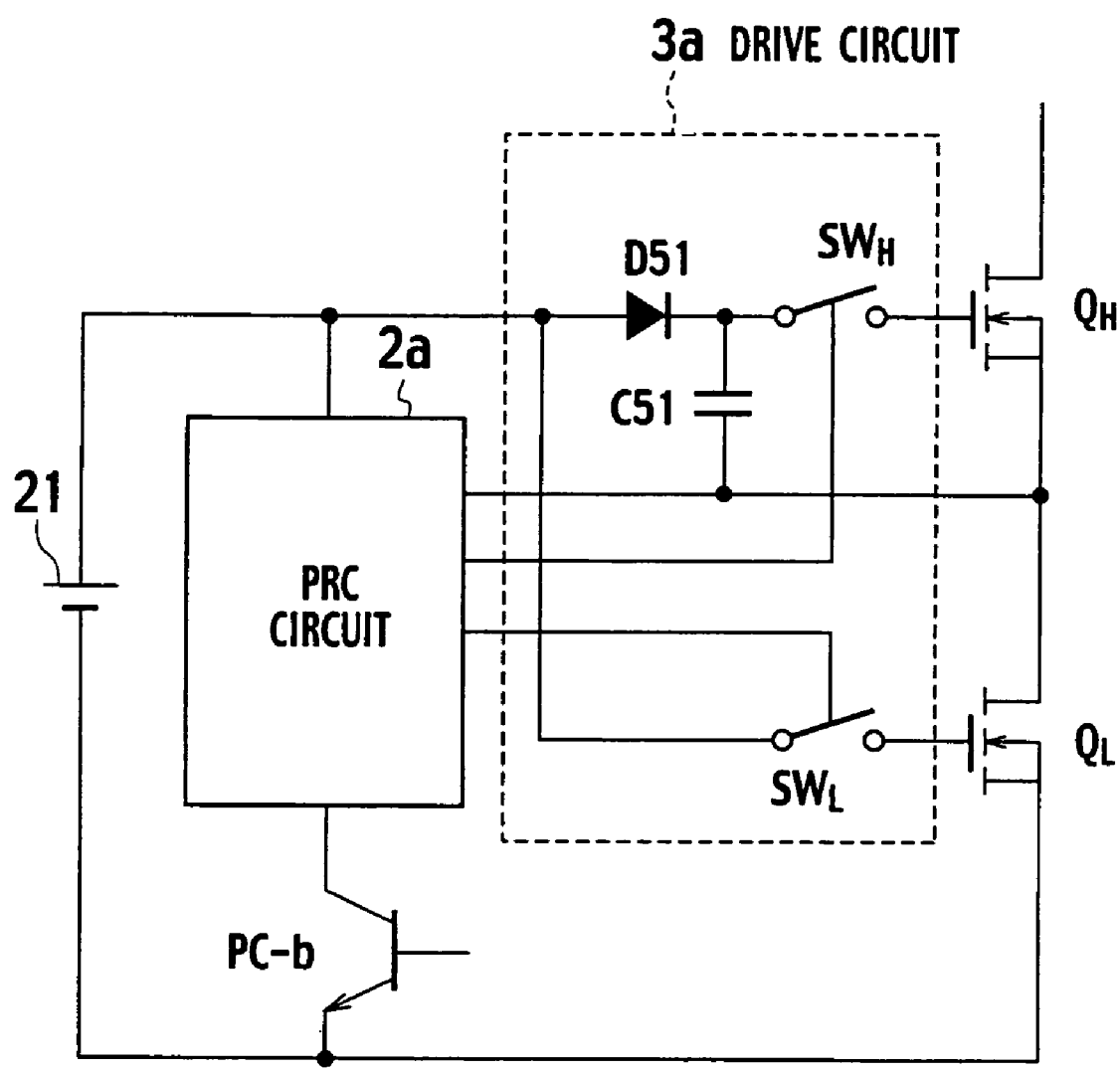
FIG. 12 is a circuit diagram showing an example of a drive circuit for driving switching elements $Q_L$ and $Q_H$.

Moreover, a half bridge formed by connecting the switching elements $Q_L$ and $Q_H$ in series is used in FIG. 4. In this case, in order to drive and turn on the switching element $Q_H$ on a plus potential (positive electrode potential) side, it is necessary to apply a higher voltage than a voltage applied between a drain and a source of the switching element $Q_L$, to the gate of the switching element $Q_H$. Accordingly, a drive circuit 3a shown in FIG. 12 is used, for example.

The drive circuit 3a includes a switch $SW_L$, a rectifying-smoothing circuit, and a switch $SW_H$. The switch $SW_L$ is connected between the PRC circuit 2a and the gate of the switching element $Q_L$. The rectifying-smoothing circuit includes a diode D51 and a capacitor C51 to be connected to the PRC circuit 2a. The switch $SW_H$ is connected between a node of the diode D51 and the capacitor C51, and the gate of the switching element $Q_H$.

When the switch $SW_L$ in the drive circuit 3a is closed, the switching element $Q_L$ is turned on by a signal from the PRC circuit 2a. At this time, the capacitor C51 is charged by the direct-current power source 1 through the diode D51.

Next, the switch $SW_L$ is opened and the switch $SW_H$ is closed. The voltage charged in the capacitor C51 is applied between the gate and a source of the switching element $Q_H$, and the switching element $Q_H$ is thereby turned on. By using the drive circuit 3a, it is possible to drive the switching element $Q_H$ without requiring a special power source.

However, when using the drive circuit 3a, it is necessary to fully charge the capacitor C51 when the switching element $Q_L$ is turned on. In the case of the conventional PWM control method, the on-width of the switching element $Q_H$ is increased and the on-width of the switching element $Q_L$ is reduced along with reduction in the input voltage.

Meanwhile, another controlling method exists configured to supply the energy from the primary side to the secondary side when the switching element $Q_H$ is turned on by inverting polarity of the secondary winding of the transformer relative to polarity of the secondary winding of the transformer of the first embodiment.

In this method, the output is controlled by adjusting the on-width of the switching element $Q_L$ when the load is changed. That is, the PRC circuit can set the on-period of the switching element $Q_H$ to a fixed length and control the on-period of the switching element $Q_L$ variably based on the output voltage. In this way, the on-width of the switching element $Q_L$ is reduced when the load is small. However, in this controlling method, it is not possible to charge the capacitor C51 sufficiently when the on-width of the switching element $Q_L$ is reduced. Therefore, cases may exist in which a sufficient voltage for turning on the switching element $Q_H$ is not ensured.

On the contrary, in the switching power supply of the first embodiment, the on-width of the switching element $Q_L$ is fixed and set longer than the half value of the cycle of the resonant current attributable to the current-resonant capacitor Cri and the resonant reactor Lr. Accordingly, it is possible to fully charge the capacitor C51 under any condition. In this way, it is possible to avoid a failure to drive the switching element $Q_H$.

As described above, according to the switching power supply of the first embodiment, the switching element $Q_H$ is connected to the positive electrode of the direct-current power source 1 while the switching element $Q_L$ is connected to the negative electrode of the direct-current power source 1, and the on-width of the switching element $Q_L$ is fixed. In this way, a drive power source for the switching element $Q_H$ is surely generated in a time period when the switching element $Q_L$ is turned on. Therefore, it is not necessary to provide a discrete drive power source for turning on the switching element $Q_H$ connected to the positive electrode of the direct-current power source 1.

Second Embodiment

Figure 13:
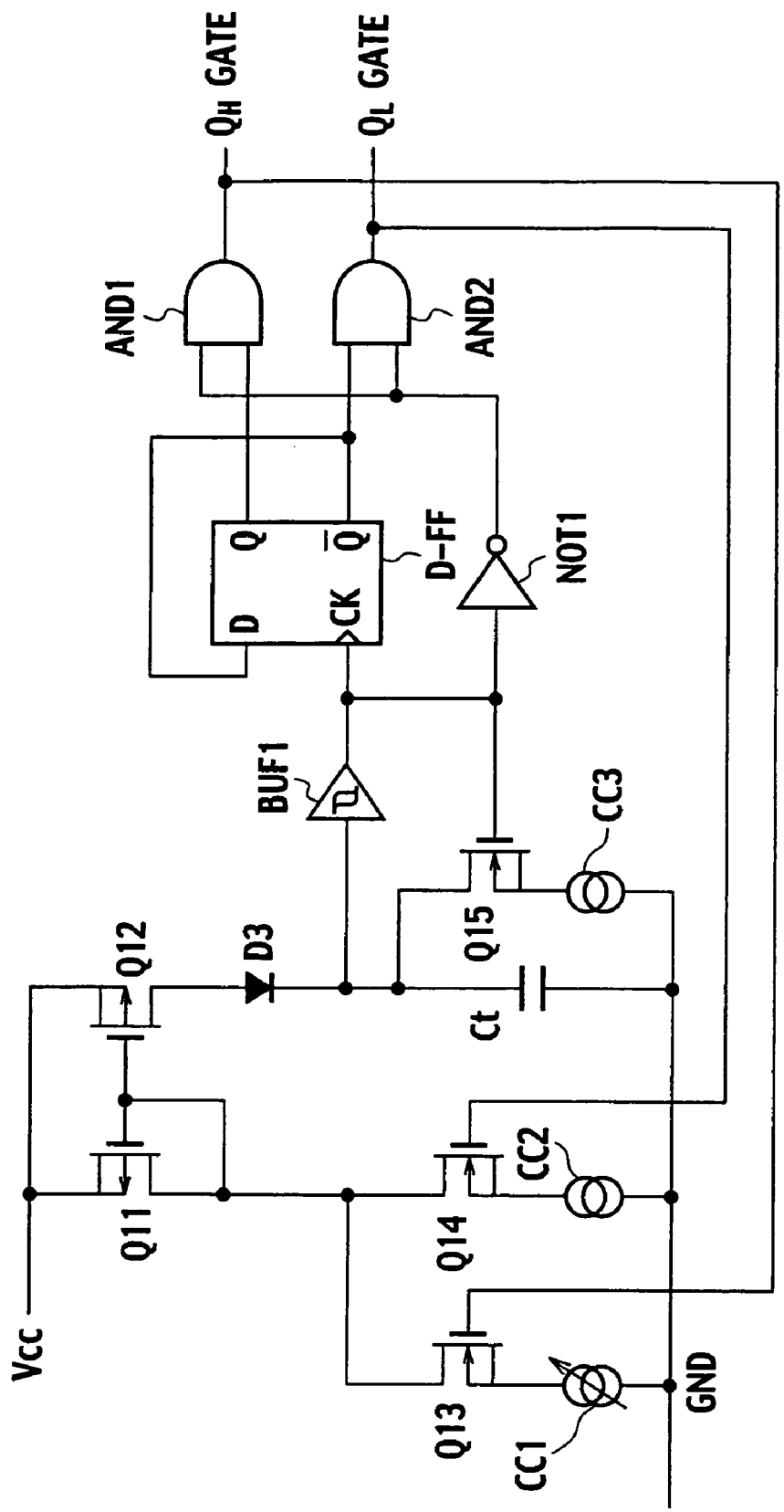
FIG. 13 is a circuit diagram showing another example of a PRC circuit embedded in a switching power supply according to a second embodiment.

FIG. 13 is a circuit diagram showing another example of a PRC circuit embedded in a switching power supply according to a second embodiment. The PRC circuit of the second embodiment is configured to turn a switching element $Q_H$ on in a time period when a charged voltage of a capacitor transits from a first threshold to a second threshold by charging the capacitor using a current flowing in response to the output voltage with a single capacitor.

The PRC circuit discharges charges in the capacitor from the second threshold to the first threshold, and then turns a switching element $Q_L$ on in a period when the charged voltage of the capacitor transits from the first threshold to the second threshold. Specifically, the PRC circuit fixes an on-period of the switching element $Q_L$ and controls an on-period of a switching element $Q_H$ variably.

In FIG. 13, drains of FETs Q11 and Q12 are connected to a power source Vcc. Gates of the FETs Q11/Q12, and a source of the FET Q11 are connected together. The FETs Q11 and Q12 collectively constitute a current mirror circuit. A capacitor Ct is charged by the current mirror circuit, and a voltage on the capacitor Ct is inputted to a Schmidt trigger circuit BUF1.

The source of the FET Q11 is connected to drains of FETs Q13 and Q14. A source of the FET Q13 is connected to a ground GND through a current source CC1. A source of the FET Q14 is connected to the ground GND through a current source CC2. The current source CC1 is a variable current source configured to supply a current based on a current of a photocoupler PC1, which is determined by an error signal from an output voltage detection circuit 5. Meanwhile, the current sources CC2 and CC3 are constant current sources configured to supply a predetermined current.

A gate signal to be outputted to a gate of the switching element $Q_H$ is applied to a gate of the FET Q13. A gate signal to be outputted to a gate of the switching element $Q_L$ is applied to a gate of the FET Q14. By these gate signals, the FETs Q13 and Q14 are alternately turned on and off, whereby a charge current to the capacitor Ct is alternately switched.

A source of the FET Q12 is connected to an anode of a diode D3. A cathode of the diode D3 is connected to one end of the capacitor Ct, a drain of an FET Q15, and an input terminal of the Schmidt trigger circuit BUF1. The other end of the capacitor Ct is connected to the ground GND. A source of the FET Q15 is connected to the ground GND through the current source CC3.

The Schmidt trigger circuit BUF1 retains an L level in a time period when the voltage on the capacitor Ct transits from a first threshold Vt1 to a second threshold Vt2 greater than the first threshold Vt1. The Schmidt trigger circuit BUF1 is set to an H level when the voltage on the capacitor Ct reaches the second threshold Vt2, and then retains the H level in a time period from the second threshold Vt2 to the first threshold Vt1.

An output terminal of the Schmidt trigger circuit BUF1 and a gate of the FET Q15 are connected to a clock terminal CK of a flip-flop circuit D-FF and to an input terminal of a NOT circuit NOT1. An inverted output from the flip-flop circuit D-FF is connected to a terminal D.

An AND circuit AND1 calculates a logical product of an output Q from the flip-flop circuit D-FF and an output from the NOT circuit NOT1, and outputs that logical product output as a gate signal to the switching element $Q_H$. An AND circuit AND2 calculates a logical product of the inverted output from the flip-flop circuit D-FF and the output from the NOT circuit NOT1, and outputs that logical product output as a gate signal to the switching element $Q_L$.

The transistors Q11/Q12/Q13, the current source CC1, and the capacitor Ct collectively constitute the first switching element control unit of the present invention. The transistors Q11/Q12/Q14/Q15, the current sources CC2/CC3, and the capacitor Ct collectively constitute the second switching control unit of the present invention.

Figure 14:
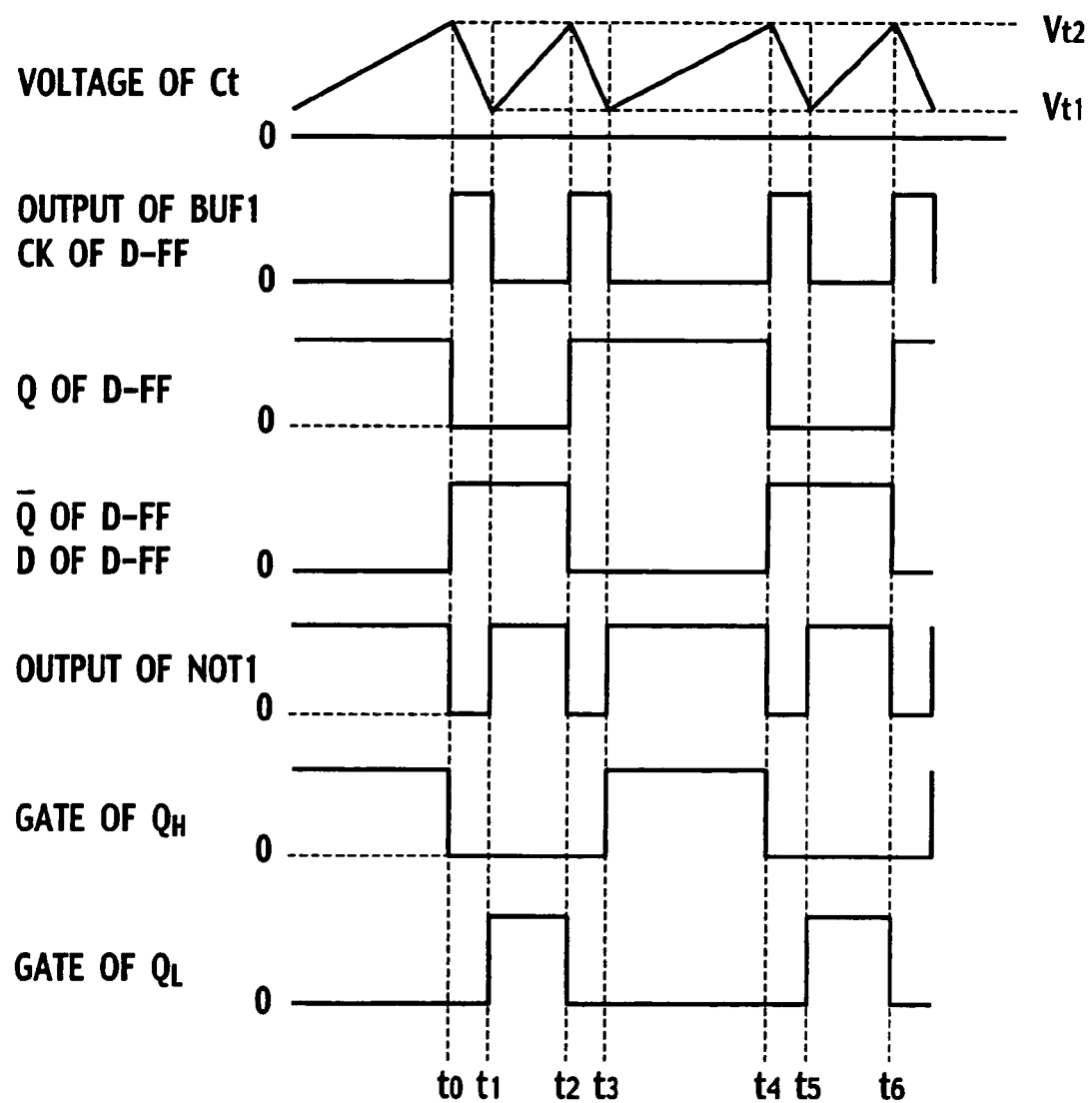
FIG. 14 shows timing charts of operating waveforms of respective portions in the PRC circuit shown in FIG. 13.

Next, operations of the PRC circuit of the second embodiment will be described in detail with reference to timing charts shown in FIG. 14.

First, when the output Q from the flip-flop circuit D-FF is set to the H level before time to, the output from the AND circuit AND1, i.e. the gate signal to the switching element $Q_H$ is set to the H level. The FET Q13 is turned on by the H level. Accordingly, the current mirror circuit composed of the current source CC1, the FETs Q11 and Q12 is operated and the capacitor Ct is charged by the current from the photocoupler PC.

Next, when the voltage on the capacitor Ct reaches the second threshold Vt2 at the time $t_0$, the output from the Schmidt trigger circuit BUF1 is inverted to the H level. The output from the flip-flop circuit D-FF is inverted by the signal from the Schmidt trigger circuit BUF1. Specifically, the output Q is set to the L level and the inverted output thereof is set to the H level. The output from the AND circuit AND1 is set to the L level. Accordingly, the gate signal to the switching element $Q_H$ is set to the L level and the switching element $Q_H$ is thereby turned off. At this time, the FET Q13 is turned off to stop charging the capacitor Ct. Simultaneously, the output from the Schmidt trigger circuit BUF1 is set to the H level, and the FET Q15 is thereby turned on. Therefore, the capacitor Ct is discharged by a predetermined current from the current source CC3. Accordingly, the voltage on the capacitor Ct is linearly reduced, starting from the time $t_0$.

Next, when the voltage on the capacitor Ct reaches the first threshold Vt1 at time $t_1$, the output from the Schmidt trigger circuit BUF1 is inverted to the L level. The output from the Schmidt trigger circuit BUF1 is inputted to the AND circuit AND2 through the NOT circuit NOT1. Therefore, the AND circuit AND2 is set to the H level to turn the switching element $Q_L$ on. Simultaneously, the FET Q14 is turned on to operate the current mirror circuit composed of the current source CC2, the FETs Q11 and Q12. In this way, the capacitor Ct is charged by the predetermined current from the current source CC2.

Next, when the voltage on the capacitor Ct reaches the second threshold Vt2 at time $t_2$, the output from the Schmidt trigger circuit BUF1 is inverted to the H level. The output from the flip-flop circuit D-FF is also inverted. Specifically, the output Q is set to the H level and the inverted output thereof is set to the L level. The output of the AND circuit AND2 is set to the L level to turn the switching element $Q_L$ off. Accordingly, the FET Q14 is turned off to stop charging the capacitor Ct. Simultaneously, the output from the Schmidt trigger circuit BUF1 is set to the H level. Therefore, the FET Q15 is turned on and the capacitor Ct is discharged by the predetermined current from the current source CC3.

Next, when the voltage on the capacitor Ct reaches the first threshold Vt1 at time $t_3$, the output from the Schmidt trigger circuit BUF1 is inverted to the L level. The output from the Schmidt trigger circuit BUF1 is inputted to the AND circuit AND1 through the NOT circuit NOT1. Accordingly, the output from the AND circuit AND1 is set to the H level to turn on the switching element $Q_H$.

The switching elements $Q_L$ and $Q_H$ are alternately turned on and off by repeating the foregoing operations.

As described above, the PRC circuit of the second embodiment is configured to use the single capacitor Ct and to charge the capacitor Ct by use of the current flowing in response to the output voltage, i.e. by use of the current from the current source CC1 based on the current from the photocoupler PC1. The PRC circuit turns the switching element $Q_H$ on in the time period when the voltage on the capacitor Ct transits from the first threshold Vt1 to the second threshold Vt2 (such as a time interval from $t_3$ to $t_4$). The PRC circuit discharges the charges in the capacitor Ct from the second threshold Vt2 to the first threshold Vt1 (such as the time t3), and then charges the capacitor Ct by use of the predetermined constant current (the current from the current source CC2). The PRC circuit turns the switching element $Q_L$ on in the time period when the voltage on the capacitor Ct transits from the first threshold Vt1 to the second threshold Vt2 (such as a time interval from $t_5$ to $t_6$). In other words, the PRC circuit can set the on-period of the switching element $Q_L$ to a fixed length and control the on-period of the switching element $Q_H$ variably. Further, the PRC circuit can set the on-period of the switching element $Q_H$ to a fixed length and control the on-period of the switching element $Q_L$ variably based on the output voltage.

The present invention is applicable to switching power supplies such as a DC-DC converter or an AC-DC converter.

What is claimed is:

1. A switching power supply comprising:
   a transformer configured to include a primary winding and a secondary winding;
   a first series circuit formed by connecting first and second switching elements in series at both ends of a direct-current power source;
   a second series circuit formed by connecting a resonant capacitor, a resonant reactor, and the primary winding of the transformer in series at both ends of the first switching element;
   a rectifying-smoothing circuit configured to rectify and smooth a voltage generated on the secondary winding of the transformer when the second switching element turns on, and to supply an output voltage to a load, the rectifying-smoothing circuit including a diode and a smoothing capacitor; and
   a control circuit configured to turn the first and second switching elements on and off alternately based on the output voltage from the rectifying-smoothing circuit,
   wherein the control circuit sets an on-period of the second switching element to a predetermined time period longer than a half value of a cycle of a resonant current attributable to the resonant reactor and the resonant capacitor, and controls an on-period of the first switching element based on the output voltage from the rectifying-smoothing circuit.

2. The switching power supply according to claim 1, wherein the first switching element is connected to a positive electrode of the direct-current power source, and the second switching element is connected to a negative electrode of the direct-current power source.

3. The switching power supply according to claim 1, the control circuit further comprising:
   a first switching element control unit configured to turn the first switching element on in a time period when a charged voltage of a capacitor transits from a first threshold to a second threshold by charging the capacitor using a current flowing in response to the output voltage; and
   a second switching element control unit configured to discharge charges in the capacitor from the second threshold to the first threshold and to turn the second switching element on in the predetermined time period when the charged voltage of the capacitor transits from the first threshold to the second threshold by charging the capacitor using a predetermined current.

4. The switching power supply according to claim 2, the control circuit further comprising:
   a first switching element control unit configured to turn the first switching element on in a time period when a charged voltage of a capacitor transits from a first threshold to a second threshold by charging the capacitor using a current flowing in response to the output voltage; and
   a second switching element control unit configured to discharge charges in the capacitor from the second threshold to the first threshold and to turn the second switching element on in the predetermined time period when the charged voltage of the capacitor transits from the first threshold to the second threshold by charging the capacitor using a predetermined current.

5. The switching power supply according to claim 1, the control circuit further comprising:
   a first switching element control unit configured to turn the first switching element on in a time period when a charged voltage of a first capacitor transits from a voltage at a start of charging to a first predetermined voltage by charging the first capacitor using a current flowing in response to the output voltage; and
   a second switching element control unit configured to turn the second switching element on in the predetermined time period when a charged voltage of a second capacitor transits from a voltage at a start of charging to a second predetermined voltage by charging the second capacitor using a predetermined current.

6. The switching power supply according to claim 2, the control circuit further comprising:
   a first switching element control unit configured to turn the first switching element on in a time period when a charged voltage of a first capacitor transits from a voltage at a start of charging to a first predetermined voltage by charging the first capacitor using a current flowing in response to the output voltage; and
   a second switching element control unit configured to turn the second switching element on in the predetermined time period when a charged voltage of a second capacitor transits from a voltage at a start of charging to a second predetermined voltage by charging the second capacitor using a predetermined current.

7. A switching power supply comprising:
   a transformer configured to include a primary winding and a secondary winding;
   a first series circuit formed by connecting first and second switching elements in series at both ends of a direct-current power source;
   a second series circuit formed by connecting a resonant capacitor, a resonant reactor, and the primary winding of the transformer in series at both ends of the second switching element;
   a rectifying-smoothing circuit configured to rectify and smooth a voltage generated on the secondary winding of the transformer when the second switching element turns on, and to supply an output voltage to a load, the rectifying-smoothing circuit including a diode and a smoothing capacitor; and a control circuit configured to turn the first and second switching elements on and off alternately based on the output voltage from the rectifying-smoothing circuit, wherein the control circuit sets an on-period of the second switching element to a predetermined time period longer than a half value of a cycle of a resonant current attributable to the resonant reactor and the resonant capacitor, and controls an on-period of the first switching element based on the output voltage from the rectifying-smoothing circuit.

8. The switching power supply according to claim 7, the control circuit further comprising:

a second switching element control unit configured to turn the second switching element on in a time period when a charged voltage of a capacitor transits from a first threshold to a second threshold by charging the capacitor using a current flowing in response to the output voltage; and a first switching element control unit configured to discharge charges in the capacitor from the second threshold to the first threshold and to turn the first switching element on in the predetermined time period when the charged voltage of the capacitor transits from the first threshold to the second threshold by charging the capacitor using a predetermined current.

9. The switching power supply according to claim 7, the control circuit further comprising:

a second switching element control unit configured to turn the second switching element on in a time period when a charged voltage of a first capacitor transits from a voltage at a start of charging to a first predetermined voltage by charging the first capacitor using a current flowing in response to the output voltage; and a first switching element control unit configured to turn the first switching element on in the predetermined time period when a charged voltage of a second capacitor transits from a voltage at a start of charging to a second predetermined voltage by charging the second capacitor using a predetermined current.

10. The switching power supply according to claim 1, the control circuit further comprising:

a current mirror circuit configured to include a first transistor and a second transistor;

a third series circuit formed by connecting in series the first transistor, a third transistor, and a variable current source flowing a current in response to the output voltage;

a capacitor connected to the second transistor in series;

a first control unit configured to turn the first switching element on in a time period when a charged voltage of the capacitor transits from a first threshold to a second threshold by charging the capacitor using the current of the variable current source by turning the third transistor on;

a fourth series circuit formed by connecting the first transistor, a fourth transistor, and a first current source in series;

a fifth series circuit formed by connecting a fifth transistor, and a second current source in series at both ends of the capacitor;

a second control unit configured to discharge charges in the capacitor from the second threshold to the first threshold using the second current source by turning the third transistor off and the fifth transistor on, and to turn the second switching element on in the predetermined time period when a charged voltage of the capacitor transits from the first threshold to the second threshold by charging the capacitor using a predetermined current of the first current source by turning the fourth element on.

11. The switching power supply according to claim 2, the control circuit further comprising:

a current mirror circuit configured to include a first transistor and a second transistor;

a third series circuit formed by connecting in series the first transistor, a third transistor, and a variable current source flowing a current in response to the output voltage;

a capacitor connected to the second transistor in series;

a first control unit configured to turn the first switching element on in a time period when a charged voltage of the capacitor transits from a first threshold to a second threshold by charging the capacitor using the current of the variable current source by turning the third transistor on;

a fourth series circuit formed by connecting the first transistor, a fourth transistor, and a first current source in series;

a fifth series circuit formed by connecting a fifth transistor, and a second current source in series at both ends of the capacitor;

a second control unit configured to discharge charges in the capacitor from the second threshold to the first threshold using the second current source by turning the third transistor off and the fifth transistor on, and to turn the second switching element on in the predetermined time period when a charged voltage of the capacitor transits from the first threshold to the second threshold by charging the capacitor using a predetermined current of the first current source by turning the fourth element on.

12. The switching power supply according to claim 1, the control circuit further comprising:

a current mirror circuit configured to include a first transistor and a second transistor;

a photocoupler connected to the first transistor in series and configured to flow a current in response to the output voltage;

a first capacitor connected to the first transistor in series and charged by flowing the current in response to the output voltage;

a first comparator configured to turn the first switching element on in a time period when a charged voltage of the first capacitor transits from a voltage at a start of charging to first predetermined voltage by comparing the charged voltage of the first capacitor with the first predetermined voltage;

a third transistor connected to the first capacitor in parallel and configured to discharge charges of the first capacitor when the charged voltage of the first capacitor is larger than the first predetermined voltage;

a second capacitor connected to a current source in series and charged by a predetermined current of the current source;

a second comparator configured to turn the second switching element on in a time period when a charged voltage of the second capacitor transits from a voltage at the start of charging to a second predetermined voltage by comparing the charged voltage of the second capacitor with the second predetermined voltage; and a fourth transistor connected to the second capacitor in parallel and configured to discharge charges of the second capacitor when the charged voltage of the second capacitor is larger than the second predetermined voltage.

13. The switching power supply according to claim 2, the control circuit further comprising:
- a current mirror circuit configured to include a first transistor and a second transistor;
- a photocoupler connected to the first transistor in series and configured to flow a current in response to the output voltage;
- a first capacitor connected to the first transistor in series and charged by flowing the current in response to the output voltage;
- a first comparator configured to turn the first switching element on in a time period when a charged voltage of the first capacitor transits from a voltage at a start of charging to first predetermined voltage by comparing the charged voltage of the first capacitor with the first predetermined voltage;
- a third transistor connected to the first capacitor in parallel and configured to discharge charges of the first capacitor when the charged voltage of the first capacitor is larger than the first predetermined voltage;
- a second capacitor connected to a current source in series and charged by a predetermined current of the current source;
- a second comparator configured to turn the second switching element on in a time period when a charged voltage of the second capacitor transits from a voltage at the start of charging to a second predetermined voltage by comparing the charged voltage of the second capacitor with the second predetermined voltage; and
- a fourth transistor connected to the second capacitor in parallel and configured to discharge charges of the second capacitor when the charged voltage of the second capacitor is larger than the second predetermined voltage.

* * * * *